No. 701,555. Patented June 3, 1902.
W. M. EWING.
RAISIN OR FRUIT ELEVATOR.
(Application filed Aug. 20, 1900. Renewed Mar. 17, 1902.)
(No Model.)

Witnesses.
W. N. Rohrer
Inventor.
William M. Ewing

UNITED STATES PATENT OFFICE.

WILLIAM M. EWING, OF FRESNO, CALIFORNIA.

RAISIN OR FRUIT ELEVATOR.

SPECIFICATION forming part of Letters Patent No. 701,555, dated June 3, 1902.

Application filed August 20, 1900. Renewed March 17, 1902. Serial No. 98,641. (No model.)

*To all whom it may concern:*

Be it known that I, WILLIAM M. EWING, of the city of Fresno, county of Fresno, State of California, have invented an Improvement in Raisin or Fruit Elevators; and I hereby declare the following to be a full, clear, and exact description of the same.

This invention relates to conveying and elevating apparatus, and has special reference to an apparatus designed particularly as a raisin and fruit elevator.

To this end the invention contemplates a simple and practical construction of elevator comprising novel means for automatically filling conveyer-buckets and then discharging such buckets of their contents at any desired point of elevation.

With these and other objects in view, which will more readily appear as the nature of the invention is better understood, the same consists in the novel construction, combination, and arrangement of parts hereinafter more fully described, illustrated, and claimed.

The essential features involved in the apparatus are necessarily susceptible to some modification without departing from the spirit of the invention; but the preferred embodiment of the improvement is shown in the accompanying drawings, in which—

Figure 2:
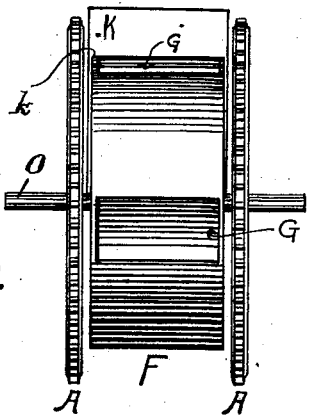
Figure 1:
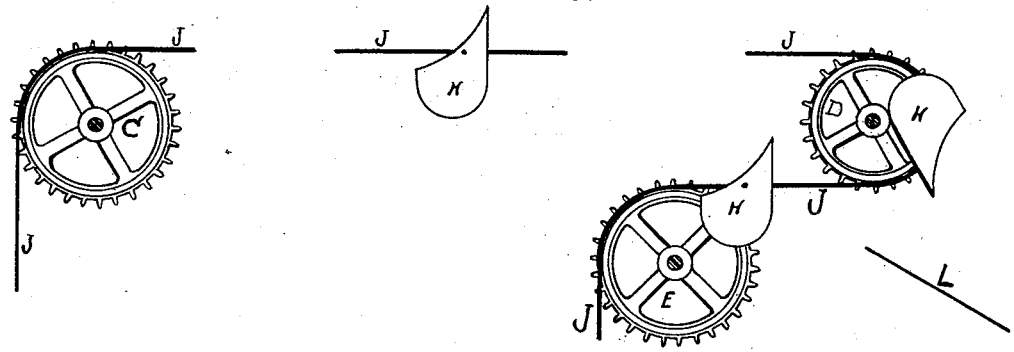
Figure 1:
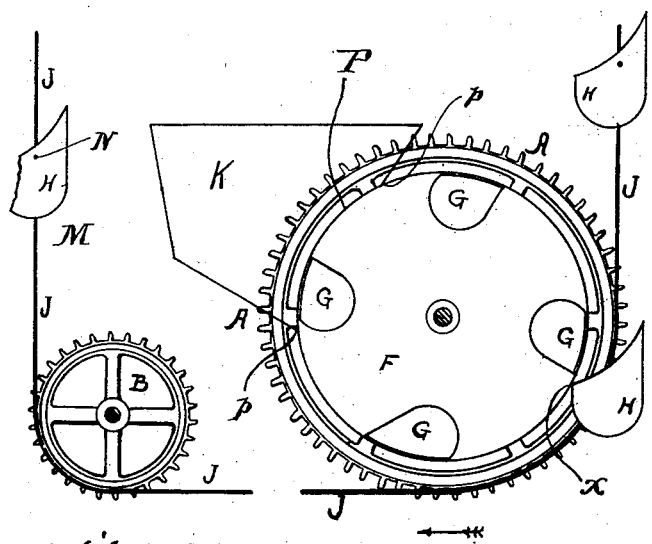

Figure 1 is a diagrammatic elevation of a conveying and lifting apparatus constructed in accordance with the present invention. Fig. 2 is a side view of the rotary cylindrical filling-drum and the driving-sprockets arranged, respectively, at opposite sides thereof upon the drum-shaft.

Like numerals of reference designate corresponding parts in both figures of the drawings.

In carrying out the invention the operative parts are necessarily associated with suitable framework or supports; but inasmuch as such framework or supports may be of any construction and arrangement it has not been deemed necessary to illustrate the same in the drawings; but in all embodiments of the invention the same involves the employment of an endless conveyer M, essentially comprising spaced parallel endless sprocket-chains J and a series of equally-spaced gravity-buckets H, arranged between the chains and pivotally connected thereto by means of suitable pivots N, said pivots providing axes upon which the buckets can readily tilt. The said equally-spaced buckets H of the conveyer may necessarily be of different shapes and sizes, according to the character of work to be performed by the apparatus, but in all forms are provided with closed bottoms and normally hang pendent from their pivots in an upright position, except at the point of discharge, as will hereinafter more fully appear. The spaced parallel sprocket-chains J of the conveyer pass beneath and engage with the teeth of the spaced master sprocket-wheels A, which are mounted upon the drum-shaft O, respectively, at opposite sides of the rotary cylindrical filling-drum F. This filling-drum is preferably in the form of a hollow cylinder and is provided with a peripheral series of pockets G for the material to be carried by the buckets of the conveyer to the point of discharge. The several peripheral pockets G of the drum are open at the rim of the drum, so as to freely receive the material and also freely deliver the same into the buckets H, and to provide for the filling of the peripheral pockets G there is associated with the drum F a hopper K. This hopper is arranged in the interval between the spaced master sprocket-wheels A and is cut away at the lower side thereof, as at $k$, so as to closely fit the periphery or rim of the drum at one side of the vertical axis thereof, and in the side or bottom next to the drum the said hopper is provided with a bottom opening P, the opposite edges $p$ of which opening closely fit the drum-body, whereby the latter serves to cover the said opening P and will successively bring the pockets G within the plane of said opening in order that the pockets may be filled by the material within the hopper.

The oppositely-arranged master sprocket-wheels A are of a slightly-greater diameter than the diameter of the drum F, so that one upper edge of the gravity-buckets will contact with the rim of the drum at the point $x$, contiguous to the inverted and discharging pocket G, as plainly shown in Fig. 1 of the drawings.

The pockets G in the filling-drum F are of a smaller capacity than the buckets H, so that there will be no possibility of the said pockets overflowing the buckets, and it is also essential in carrying out the invention that the gravity-buckets H, carried by the sprocket-chains J, are spaced apart at distances corresponding to the spaces between the pockets G, so that as the drum F rotates each pocket as it reaches a discharging position at one side of the vertical center of the drum will come into adjacent relation to one of the buckets and directly above the open side thereof in order to empty the material from the pocket into the bucket.

The endless conveyer M may be carried in any direction from the filling-drum and to any distance above the same, such, for instance, as several stories in a building above the filling or receiving floor, and to effect a proper guiding of the endless conveyer there are employed a plurality of pairs of guiding sprocket-wheels B, C, D, and E, the sprocket-wheels B being illustrated as arranged within substantially the horizontal plane of the master sprocket-wheels A, so as to receive therearound the lower run of the chains J as they pass around the under side of the filling-drum in the direction indicated by the arrow. The guiding-sprockets C, D, and E are placed at any desired elevation above the filling-drum and usually at a higher point in the same building, and the idlers B, C, and E are preferably of a uniform size, so that the chains in passing thereover will not disturb the upright position of the buckets; but the sprocket-wheels D are of such a small diameter or mounted on a shaft of such increased size that as the buckets pass between the same their closed bottoms will strike the shaft and cause a turning or tilting of the buckets on their pivotal axes N, thus effecting a discharge of the contents, which fall upon an inclined plane L, floor, or receiving-receptacle. The guiding-sprockets D necessarily constitute a dumping device for the buckets and may be located in any position or plane where a discharge of the material is desired.

From the foregoing it is thought that the construction, operation, and many advantages of the herein-described apparatus will be readily apparent without further description, and it will be understood that various details in the form, proportion, and minor details of construction may be resorted to without departing from the spirit or sacrificing any of the advantages of the invention.

Having thus described my invention, what I claim as new, and desire to secure by Letters Patent, is—

1. The combination with an endless upright conveyer comprising sprocket-chains and a series of equally-spaced gravity-buckets pivoted therebetween, and a hopper having an opening in its bottom, of a rotary cylindrical filling-drum located adjacent to the hopper-opening, sprocket-wheels at the ends of the drum operated by said conveyer-chains, said drum being provided with a series of equally-spaced pockets, so arranged as to individually receive their charges of material from the hopper and empty the same into the respective gravity-buckets, substantially as set forth.

2. In an apparatus of the class described, the combination with the endless conveyer having equally-spaced pivotally-supported gravity-buckets, of a hopper, a rotary filling-drum provided with a series of equally-spaced pockets so arranged as to individually receive their charges of material from the hopper and empty the same into the respective gravity-buckets, and a series of guiding-idlers for the endless conveyer, one of the guiding-idlers constituting a dumping device for effecting a tilting of the buckets.

In testimony whereof I have hereunto signed my name to this specification in the presence of two subscribing witnesses.

WILLIAM M. EWING.

Witnesses:
W. N. ROHRER,
J. F. EWING.